(12) United States Patent
Kachmar

(10) Patent No.: US 9,079,370 B2
(45) Date of Patent: Jul. 14, 2015

(54) METHOD FOR EXTRUDING A DROP CABLE

(75) Inventor: Wayne M. Kachmar, North Bennington, VT (US)

(73) Assignee: ADC Telecommunications, Inc., Berwyn, PA (US)

( * ) Notice: Subject to any disclaimer, the term of this patent is extended or adjusted under 35 U.S.C. 154(b) by 0 days.

(21) Appl. No.: 13/555,644

(22) Filed: Jul. 23, 2012

(65) Prior Publication Data

US 2013/0032280 A1 Feb. 7, 2013

Related U.S. Application Data

(60) Provisional application No. 61/510,326, filed on Jul. 21, 2011.

(51) Int. Cl.
*B29C 47/02* (2006.01)
*B29D 11/00* (2006.01)
*G02B 6/44* (2006.01)

(52) U.S. Cl.
CPC ........ *B29D 11/00663* (2013.01); *B29C 47/027* (2013.01); *G02B 6/443* (2013.01); *G02B 6/448* (2013.01); *G02B 6/4433* (2013.01)

(58) Field of Classification Search
CPC .... B29C 47/027; B29C 31/08; B29C 31/085; G02B 6/4433; B29D 11/00663
USPC ................. 156/55, 244.11, 244.12, 244.22, 156/244.18, 259; 264/171.13, 171.16, 264/171.21; 385/103, 113, 114; 425/114; 242/166; 83/949, 950
See application file for complete search history.

(56) References Cited

U.S. PATENT DOCUMENTS

| | | | |
|---|---|---|---|
| 3,880,194 A * | 4/1975 | McNeal | 138/128 |
| 3,911,041 A | 10/1975 | Kaeding et al. | |
| 3,953,250 A * | 4/1976 | Golland et al. | 83/56 |
| 4,067,852 A | 1/1978 | Calundann | |
| 4,083,829 A | 4/1978 | Calundann et al. | |
| 4,130,545 A | 12/1978 | Calundann | |
| 4,161,470 A | 7/1979 | Calundann | |
| 4,190,319 A * | 2/1980 | Eggleston | 385/114 |
| 4,199,225 A * | 4/1980 | Slaughter et al. | 385/113 |

(Continued)

FOREIGN PATENT DOCUMENTS

WO WO 2010/062646 A1 6/2010
WO WO 2011/050181 A2 4/2011

OTHER PUBLICATIONS

International Search Report and Written Opinion for PCT/US2012/047861 mailed Mar. 25, 2013.

*Primary Examiner* — William Bell
(74) *Attorney, Agent, or Firm* — Merchant & Gould P.C.

(57) ABSTRACT

The present disclosure relates to a fiber optic cable and a method for manufacturing the cable. The cable includes an outer jacket that defines a fiber passage and first and second reinforcing member passages, an optical fiber ribbon, and reinforcing members. The method includes extruding the jacket, feeding the ribbon into the fiber passage, and feeding the reinforcing members into the reinforcing member passages. The jacket has a width and a thickness. The width is longer than the thickness. The reinforcing member passages are positioned on opposite sides of the fiber passage. The reinforcing members are paid-off from a single spool by paying-off a precursor reinforcing member from the spool. The precursor reinforcing member can be divided (e.g., by using a slitter) into the reinforcing members which are then fed into the reinforcing member passages.

20 Claims, 5 Drawing Sheets

(56) References Cited

U.S. PATENT DOCUMENTS

| | | | |
|---|---|---|---|
| 4,318,842 A | 3/1982 | East et al. | |
| 4,468,364 A | 8/1984 | Ide | |
| 4,715,677 A * | 12/1987 | Saito et al. | 385/114 |
| 4,830,459 A * | 5/1989 | Chicken et al. | 385/109 |
| 4,911,525 A * | 3/1990 | Hicks et al. | 385/114 |
| 5,448,670 A * | 9/1995 | Blew et al. | 385/112 |
| 5,611,017 A * | 3/1997 | Lee et al. | 385/114 |
| 6,385,828 B1 * | 5/2002 | Kiss et al. | 28/282 |
| 6,542,674 B1 | 4/2003 | Gimblet | |
| 6,826,338 B2 * | 11/2004 | Matsuyama | 385/110 |
| 7,185,838 B2 * | 3/2007 | Mullebrouck et al. | 242/166 |
| 7,379,642 B2 | 5/2008 | Kashmar | |
| 7,587,111 B2 | 9/2009 | De Montmorillon et al. | |
| 7,623,747 B2 | 11/2009 | De Montmorillon et al. | |
| 2003/0118298 A1 * | 6/2003 | Matsuyama et al. | 385/110 |
| 2006/0165355 A1 * | 7/2006 | Greenwood et al. | 385/100 |
| 2009/0152746 A1 | 6/2009 | Wells et al. | |
| 2009/0274425 A1 | 11/2009 | Caldwell et al. | |
| 2010/0278493 A1 | 11/2010 | Kachmar | |

* cited by examiner

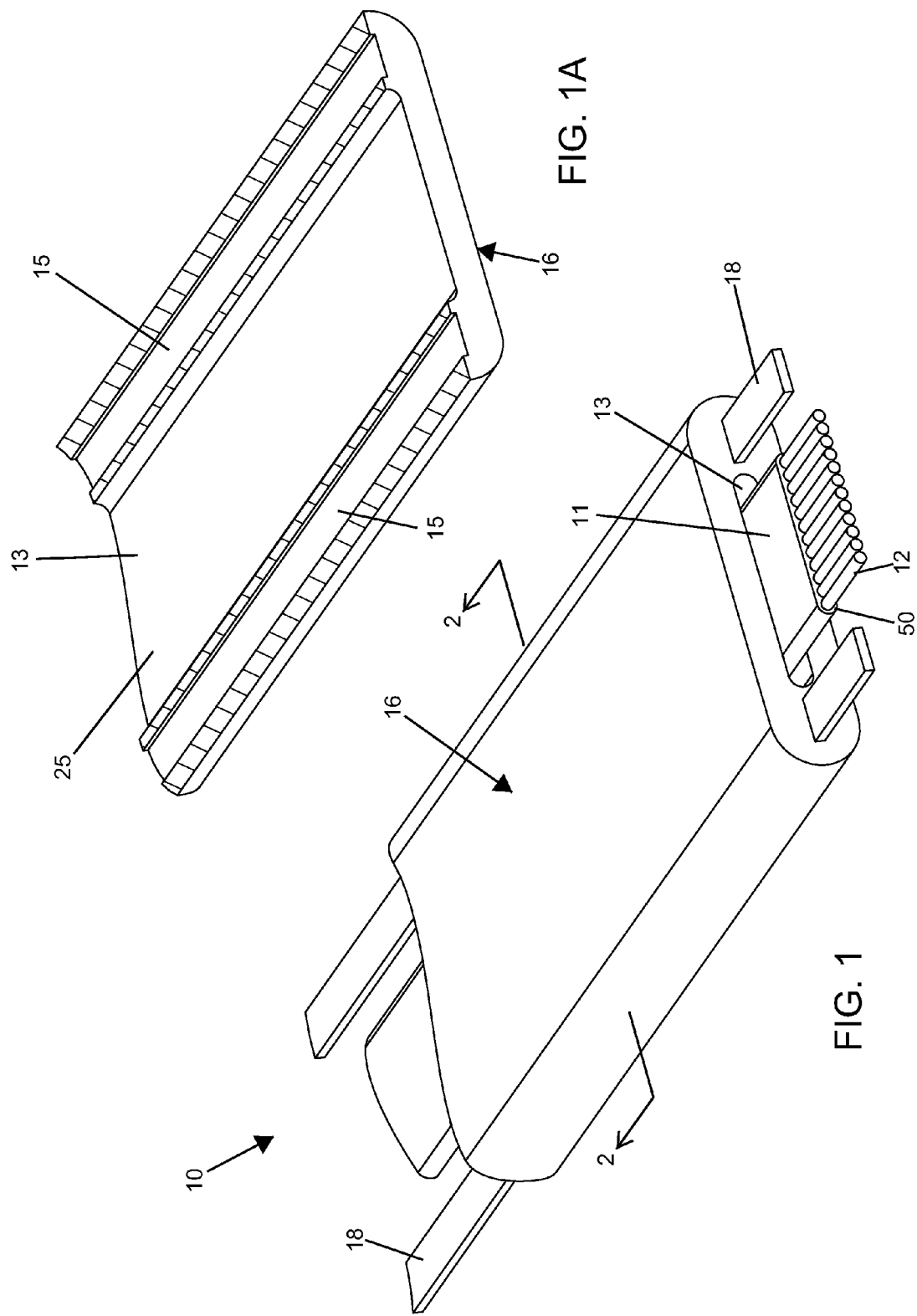

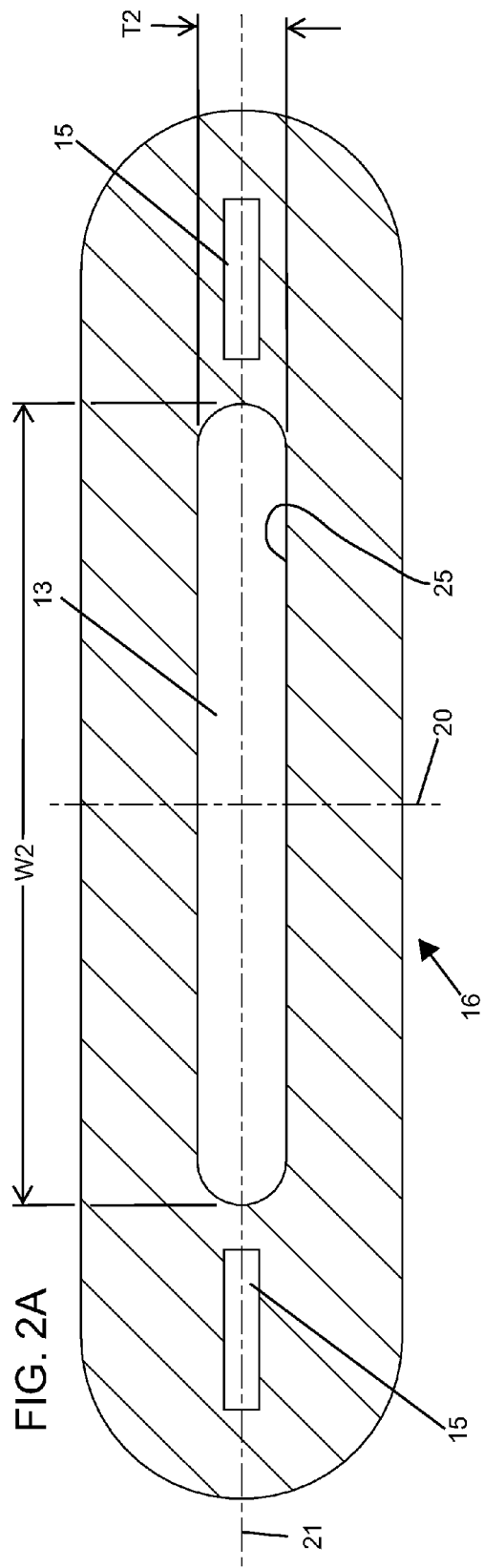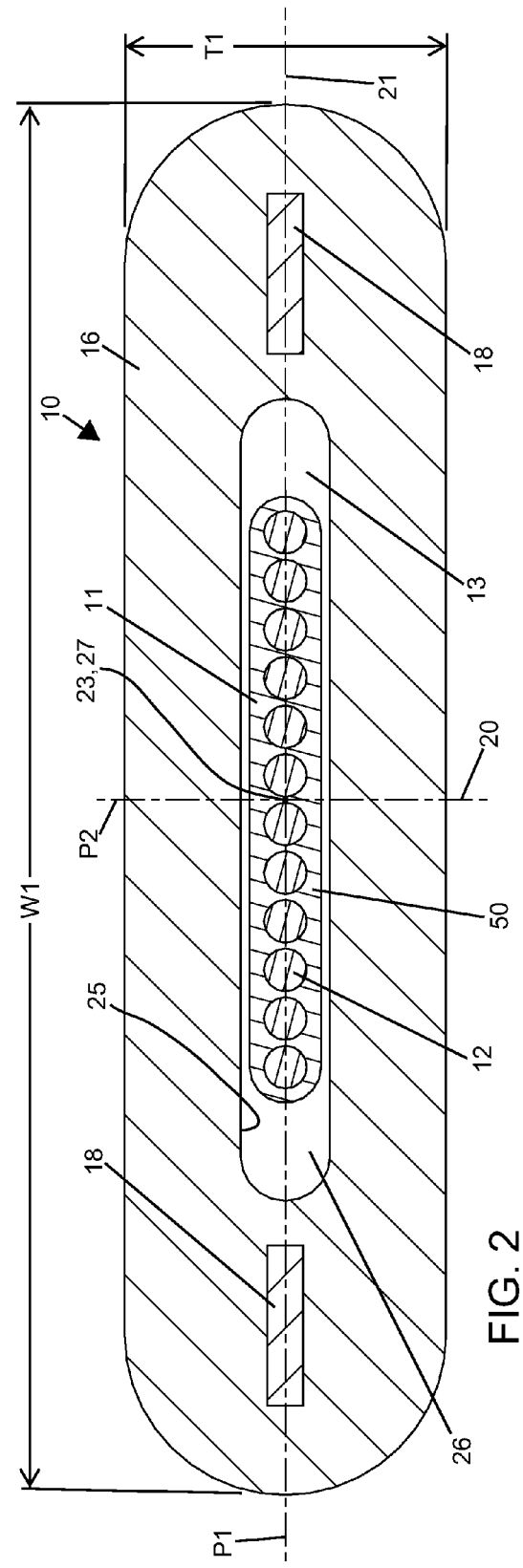
FIG. 2A
FIG. 2

METHOD FOR EXTRUDING A DROP CABLE

CROSS-REFERENCE TO RELATED APPLICATION

The present application claims the benefit of U.S. Provisional Patent Application Ser. No. 61/510,326, filed Jul. 21, 2011, which application is hereby incorporated by reference in its entirety.

TECHNICAL FIELD

The present disclosure relates to telecommunication cable. More particularly, the present disclosure relates to fiber optic cable for use in a communication network.

BACKGROUND

A fiber optic cable typically includes: (1) an optical fiber; (2) a buffer layer that surrounds the optical fiber; (3) a plurality of reinforcing members loosely surrounding the buffer layer; and (4) an outer jacket. Optical fibers function to carry optical signals. A typical optical fiber includes an inner core surrounded by a cladding that is protected by a coating. The buffer layer functions to surround and protect the coated optical fibers. Reinforcing members add mechanical reinforcement to fiber optic cables to protect the internal optical fibers against stresses applied to the cables during installation and thereafter. Outer jackets also provide protection against chemical damage.

Drop cables used in fiber optic networks can be constructed having a jacket with a flat transverse profile. Such cables typically include a central buffer tube containing a plurality of optical fibers and reinforcing members such as rods made of glass reinforced epoxy embedded in the jacket on opposite sides of the buffer tube. U.S. Pat. No. 6,542,674 discloses a drop cable of a type described above.

SUMMARY

One aspect of the present disclosure relates to a method for extruding a drop cable having reinforcing members positioned on opposite sides of a fiber passage. The method allows uniform tension to be applied to the reinforcing members during the extrusion process.

Another aspect of the present disclosure relates to a method for manufacturing a fiber optic cable. The method includes extruding an outer jacket that defines a fiber passage and first and second reinforcing member passages, feeding an optical fiber ribbon into the fiber passage, and feeding reinforcing members into the first and second reinforcing member passages. The outer jacket has an elongated transverse cross-sectional profile that defines a major axis and a minor axis that meet at a lengthwise axis of the fiber optic cable. The elongated transverse cross-sectional profile has a width that extends along the major axis and a thickness that extends along the minor axis. The width of the elongated transverse cross-sectional profile is longer than the thickness of the elongated transverse cross-sectional profile. The fiber passage extends through the outer jacket along a lengthwise axis of the outer jacket. The first and second reinforcing member passages are positioned on opposite sides of the fiber passage. The reinforcing members are paid-off from a single spool.

In certain embodiments, the reinforcing members are paid-off from the single spool by paying-off a precursor reinforcing member from the single spool. The precursor reinforcing member is then divided into the reinforcing members which are then fed into the first and second reinforcing member passages. The precursor reinforcing member can be divided into the reinforcing members using a slitter.

In other embodiments, the method further includes providing a water-blocking material within the fiber passage of the outer jacket. The water-blocking material can be a water-blocking gel.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 1 is a partially cut-away perspective view of a fiber optic cable in accordance with the principles of the present disclosure;

FIG. 1A is a cross-sectional perspective view with the same orientation as FIG. 1 of a jacket of the fiber optic cable of FIG. 1;

FIG. 2 is a transverse cross-sectional view taken along section line 2-2 of the fiber optic cable of FIG. 1;

FIG. 2A is the transverse cross-sectional view of FIG. 2, but showing only the jacket of FIG. 1A;

DETAILED DESCRIPTION

Figure 3:
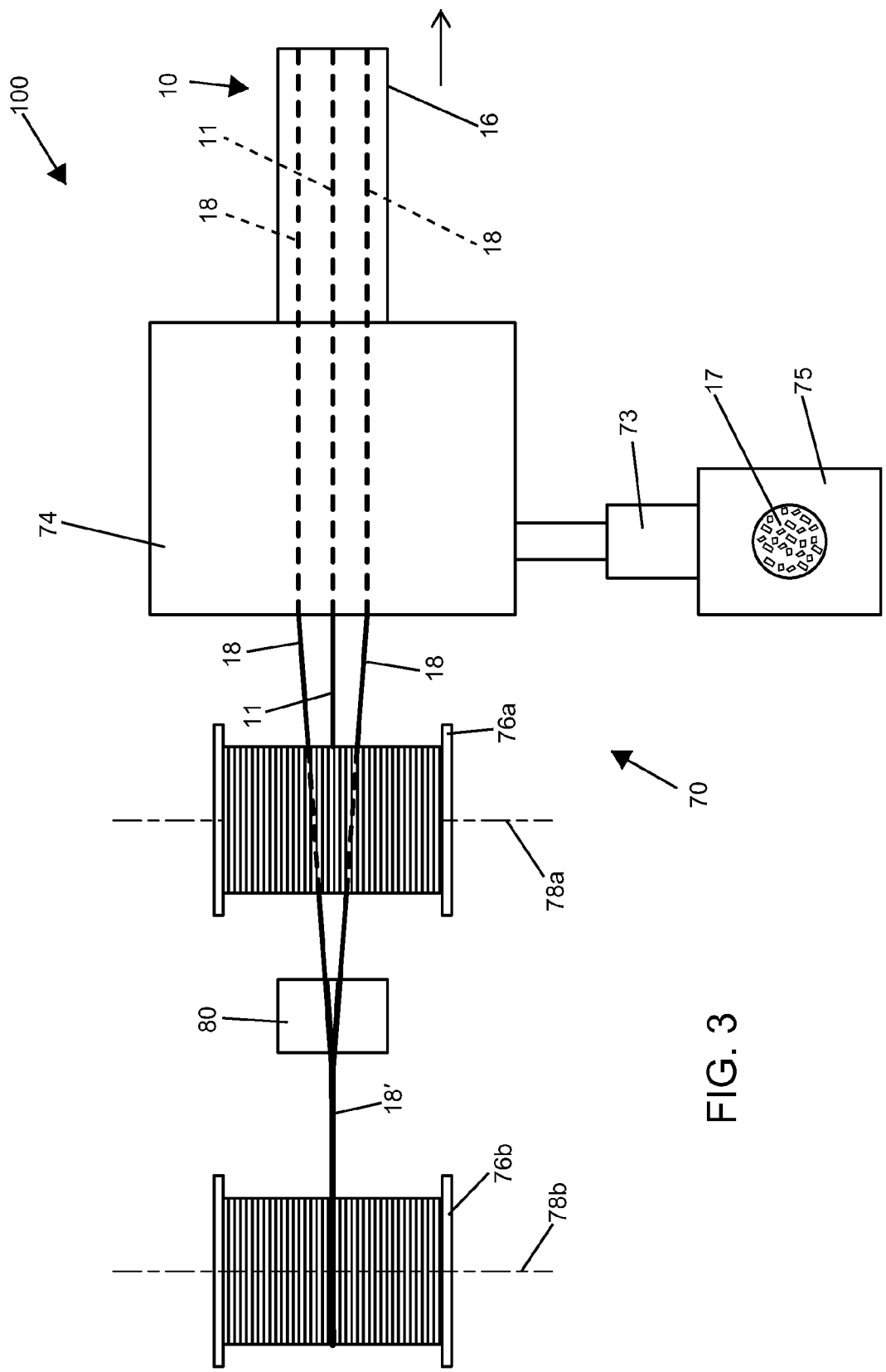
FIG. 3 is a schematic view of a system for manufacturing the fiber optic cable of FIGS. 1 and 2.

FIGS. 1 and 2 show a fiber optic cable 10 in accordance with the principles of the present disclosure. The fiber optic cable 10 includes an optical fiber ribbon 11 including a plurality of optical fibers 12 (e.g., 12 optical fibers). The optical fibers 12 of the optical fiber ribbon 11 are mechanically bound (i.e., linked, coupled, secured, etc.) together in a row by a binding material 50 (i.e., a matrix material, a substrate material, etc.). The optical fiber ribbon 11 is contained within a fiber passage 13 defined by an outer jacket 16 of the fiber optic cable 10. In the depicted embodiment, the optical fiber ribbon 11 is positioned directly within the fiber passage 13 and is not positioned within a separate buffer tube positioned within the fiber passage 13. In other embodiments, an intermediate buffing layer (e.g., a buffer tube) can be positioned between the optical fiber ribbon 11 and the outer jacket 16. A material such as gel can be provided within the fiber passage 13 for providing water blocking and for centering the optical fiber ribbon 11 within the fiber passage 13. Reinforcing members 18 are embedded in the outer jacket 16 on opposite sides of the fiber passage 13 to provide the fiber optic cable 10 with axial reinforcement (e.g., resistance to both tensile and compressive loading).

Referring to FIG. 2, the outer jacket 16 has a non-circular outer profile. For example, as shown at FIG. 2, when viewed in transverse cross-section, the outer profile of the outer jacket 16 has a flat generally obround or rectangular shape. The outer jacket 16 is longer along a major axis 20 than along a minor axis 21. The major and minor axes 20, 21 are perpendicular to one another and intersect at a center 27 of the outer jacket 16. The fiber optic cable 10 has an elongated transverse cross-sectional profile (e.g., a flattened cross-sectional profile, an oblong cross-sectional profile, an obround cross-sectional profile, etc.) defined by the outer jacket 16. A width W1 of the outer jacket 16 extends along the major axis 20 and a thickness T1 of the outer jacket 16 extends along the minor axis 21. The width W1 is longer than the thickness T1. In certain embodiments, the width W1 is at least 50 percent longer than the thickness T1. The transverse cross-sectional profile defined by the outer jacket 16 is generally rectangular with rounded ends. The major axis 20 and the minor axis 21 intersect perpendicularly at a lengthwise axis 23 of the fiber optic cable 10 which coincides with the center 27. The reinforcing members 18 have lengths that extend along the lengthwise axis 23 of the fiber optic cable 10.

The construction of the fiber optic cable 10 allows the fiber optic cable 10 to be bent more easily along a plane P1 that coincides with the minor axis 21 than along a plane P2 that coincides with the major axis 20. Thus, when the fiber optic cable 10 is wrapped around a spool or guide, the fiber optic cable 10 is preferably bent along the plane P1.

It will be appreciated that the outer jacket 16 of the fiber optic cable 10 can be shaped through an extrusion process and can be made by any number of different types of polymeric materials. In certain embodiments, the outer jacket 16 can have a construction that resists post-extrusion shrinkage of the outer jacket 16. For example, the outer jacket 16 can include a shrinkage reduction material disposed within a polymeric base material (e.g., polyethylene). U.S. Pat. No. 7,379,642, which is hereby incorporated by reference in its entirety, describes an exemplary use of shrinkage reduction material within the base material of a fiber optic cable jacket.

In one embodiment, the shrinkage reduction material is a liquid crystal polymer (LCP). Examples of liquid crystal polymers suitable for use in fiber-optic cables are described in U.S. Pat. Nos. 3,911,041; 4,067,852; 4,083,829; 4,130,545; 4,161,470; 4,318,842; and 4,468,364 which are hereby incorporated by reference in their entireties. To promote flexibility of the fiber optic cable 10, the concentration of the shrinkage reduction material (e.g. LCP) is relatively small as compared to the base material. In one embodiment, and by way of example only, the shrinkage reduction material constitutes less than about 10% of the total weight of the outer jacket 16. In another embodiment, and by way of example only, the shrinkage reduction material constitutes less than about 5% of the total weight of the outer jacket 16. In another embodiment, the shrinkage reduction material constitutes less than about 2% of the total weight of the outer jacket 16. In another embodiment, shrinkage reduction material constitutes less than about 1.9%, less than about 1.8%, less than 1.7%, less than about 1.6%, less than about 1.5%, less than about 1.4%, less than about 1.3%, less than about 1.2%, less than about 1.1%, or less than about 1.0% of the total weight of the outer jacket 16.

Example base materials for the outer jacket 16 include low-smoke zero halogen materials such as low-smoke zero halogen polyolefin and polycarbon. In other embodiments, the base material can include thermal plastic materials such as polyethylene, polypropylene, ethylene-propylene, copolymers, polystyrene and styrene copolymers, polyvinyl chloride, polyamide (i.e., nylon), polyesters such as polyethylene terephthalate, polyetheretherketone, polyphenylene sulfide, polyetherimide, polybutylene terephthalate, as well as other plastic materials. In still other embodiments, the outer jacket 16 can be made of low density, medium density or high density polyethylene materials. Such polyethylene materials can include low density, medium density or high density ultra-high molecular weight polyethylene materials.

Referring still to FIG. 2, the fiber passage 13, defined by the outer jacket 16, comprises a single fiber passage that is centered within the outer jacket 16. The fiber passage 13 has an elongated shape/profile when viewed in transverse cross-section. The fiber passage 13 is elongated along the major axis 20. In the depicted embodiment, a width W2 of the fiber passage 13 is at least 50 percent as long as the width W1 of the fiber optic cable 10. In the depicted embodiment, a thickness T2 of the fiber passage 13 is less than 50 percent of the width W2. The fiber passage 13 is defined by an inner surface 25 of the outer jacket 16 that extends through a length of the fiber optic cable 10 along the lengthwise axis 23 of the fiber optic cable 10. It is preferred for the fiber passage 13 to be filled with a water-blocking gel 26. Additionally, other structures for preventing water from migrating along the fiber passage 13 (e.g., water-swellable fibers, water-swellable tape, or water-swellable yarn) can be provided within the fiber passage 13 along with the optical fibers 12.

Referring now to FIGS. 1 and 2, one or more of the optical fibers 12 can be positioned within the fiber passage 13. In a preferred embodiment, the fiber passage 13 contains at least twelve of the optical fibers 12 bound together to form the optical fiber ribbon 11. The optical fibers 12 are preferably unbuffered and in certain embodiments have outer diameters in a range of 230-270 micrometers (µm).

Figure 5:
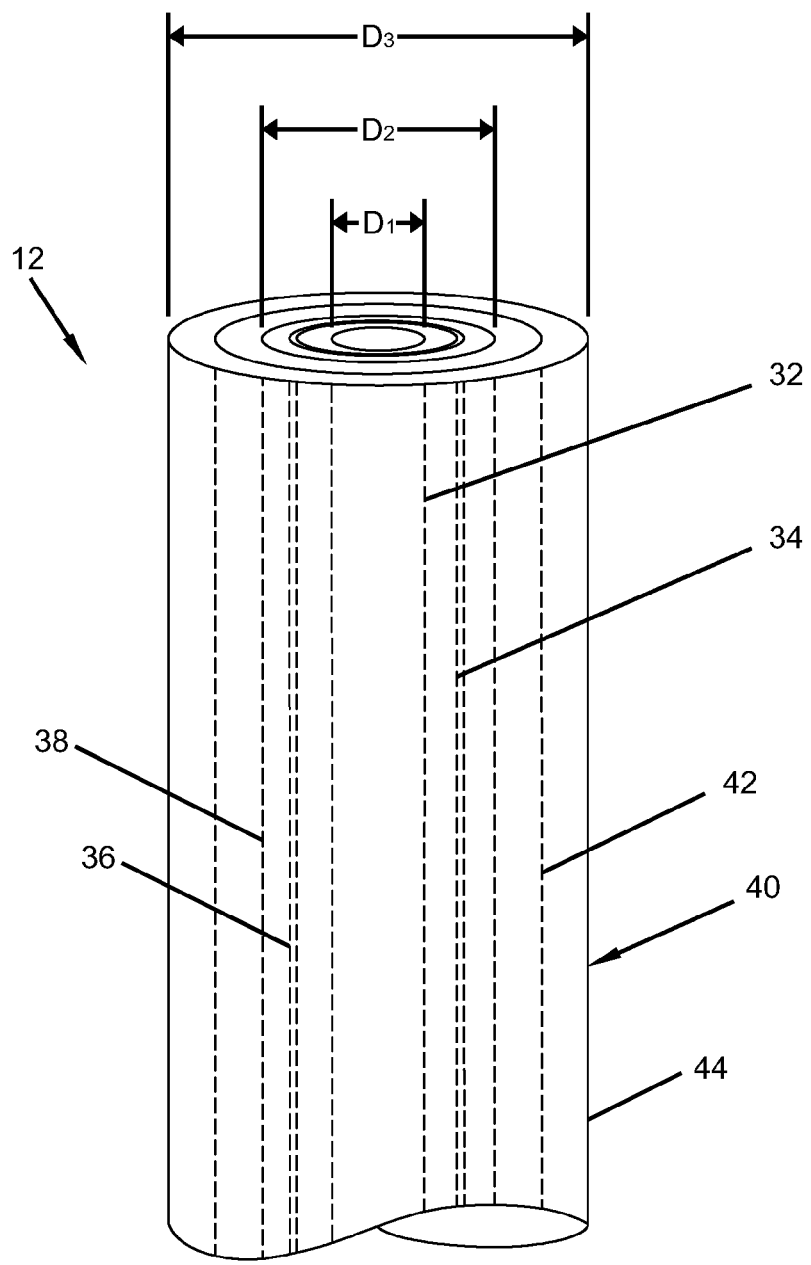
FIG. 5 is a perspective view of an optical fiber suitable for use in the fiber optic cable of FIG. 1.

It will be appreciated that the optical fibers 12 can have any number of different types of configurations. In the embodiment of FIG. 5, the optical fiber 12 includes a core 32. The core 32 is made of a glass material, such as a silica-based material, having an index of refraction. In the subject embodiment, the core 32 has an outer diameter $D_1$ of less than or equal to about 10 µm.

The core 32 of each of the optical fibers 12 is surrounded by a first cladding layer 34 that is also made of a glass material, such as a silica-based material. The first cladding layer 34 has an index of refraction that is less than the index of refraction of the core 32. This difference between the index of refraction of the first cladding layer 34 and the index of refraction of the core 32 allows an optical signal that is transmitted through the optical fiber 12 to be confined to the core 32.

A trench layer 36 surrounds the first cladding layer 34. The trench layer 36 has an index of refraction that is less than the index of refraction of the first cladding layer 34. In the subject embodiment, the trench layer 36 is immediately adjacent to the first cladding layer 34.

A second cladding layer 38 surrounds the trench layer 36. The second cladding layer 38 has an index of refraction. In the subject embodiment, the index of refraction of the second cladding layer 38 is about equal to the index of refraction of the first cladding layer 34. The second cladding layer 38 is immediately adjacent to the trench layer 36. In the subject embodiment, the second cladding layer 38 has an outer diameter $D_2$ of less than or equal to about 125 µm.

A coating, generally designated 40, surrounds the second cladding layer 38. The coating 40 includes an inner layer 42 and an outer layer 44. In the subject embodiment, the inner layer 42 of the coating 40 is immediately adjacent to the second cladding layer 38 such that the inner layer 42 surrounds the second cladding layer 38. The inner layer 42 is a polymeric material (e.g., polyvinyl chloride, polyethylenes, polyurethanes, polypropylenes, polyvinylidene fluorides, ethylene vinyl acetate, nylon, polyester, or other materials) having a low modulus of elasticity. The low modulus of elasticity of the inner layer 42 functions to protect the optical fiber 12 from microbending.

The outer layer 44 of the coating 40 is a polymeric material having a higher modulus of elasticity than the inner layer 42.

In the subject embodiment, the outer layer 44 of the coating 40 is immediately adjacent to the inner layer 42 such that the outer layer 44 surrounds the inner layer 42. The higher modulus of elasticity of the outer layer 44 functions to mechanically protect and retain the shape of the optical fiber 12 during handling. In another embodiment, the outer layer 44 has an outer diameter $D_3$ of less than or equal to about 275 μm.

In the subject embodiment, the optical fibers 12 are manufactured to reduce the sensitivity of the optical fibers 12 to micro or macro-bending (hereinafter referred to as "bend-insensitive"). Exemplary bend insensitive optical fibers have been described in U.S. Pat. Nos. 7,623,747 and 7,587,111 that are hereby incorporated by reference in their entirety. An exemplary bend-insensitive optical fiber is commercially available from Draka Comteq under the name BendBright XS. In other embodiments, the optical fibers 12 need not be bend insensitive optical fibers.

In certain embodiments, the reinforcing members 18 can include reinforcing rods that provide the fiber optic cable 10 with both tensile and compressive reinforcement. Such rods can have a glass reinforced polymer (GRP) construction. The glass reinforced polymer can include a polymer base material (e.g., epoxy) reinforced by a plurality of glass fibers such as E-glass, S-glass or other types of glass fiber.

In certain embodiments, the reinforcing members 18 are bonded to the outer jacket 16. The bonding between the reinforcing members 18 and the outer jacket 16 can be chemical bonding or thermal bonding. In one embodiment, the reinforcing members 18 may be coated with or otherwise provided with a material having bonding characteristics (e.g., ethylene acetate) to bond the reinforcing members 18 to the outer jacket 16.

In certain embodiments, the reinforcing members 18 can have a flexible construction that provides tensile reinforcement while providing minimal resistance to compressive loading. Further details of reinforcing members having such properties are disclosed at U.S. Patent Application Publication No. 2010/0278493, which is hereby incorporated by reference in its entirety.

In certain embodiments, the reinforcing member 18 is formed by a generally flat layer of reinforcing elements (e.g., fibers or yarns such as aramid fibers or yarns) embedded or otherwise integrated within a binder to form a flat reinforcing structure (e.g., a structure such as a sheet-like structure, a film-like structure, or a tape-like structure). In one example embodiment, the binder is a polymeric material such ethylene acetate acrylite (e.g., UV-cured, etc.), silicone (e.g., RTV silicone, etc.), polyester films (e.g., biaxially oriented polyethylene terephthalate polyester film, etc.), and polyisobutylene. In other example instances, the binder may be a matrix material, an adhesive material, a finish material, or another type of material that binds, couples, or otherwise mechanically links together reinforcing elements.

In other embodiments, the reinforcing member 18 can have a glass reinforced polymer (GRP) construction. The glass reinforced polymer can include a polymer base material reinforced by a plurality of glass fibers such as E-glass, S-glass, or other types of glass fiber. The polymer used in the glass reinforced polymer is preferably relatively soft and flexible after curing. For example, in one embodiment, the polymer has a Shore A hardness less than 50 after curing. In other embodiments, the polymer has a Shore A hardness less than 46 after curing. In certain other embodiments, the polymer has a Shore A hardness in the range of about 34-46.

FIG. 3 shows a system 70 for manufacturing the fiber optic cable 10. The system 70 includes a jacket material source 73 at which a material 17 used to form the outer jacket 16 of the fiber optic cable 10 is heated and masticated. The heated jacket material 17 is pressurized and forced to flow (e.g., via an auger arrangement) through an extrusion head 74 where the material 17 is shaped to the desired transverse cross-sectional profile of the outer jacket 16. In some embodiments, the outer jacket 16 is extruded to size while in other embodiments the outer jacket 16 is extruded to a larger size and subsequently drawn down to the desired size. As the jacket material 17 is extruded through the extrusion head 74, the reinforcing members 18 are fed into passages 15 formed in the jacket material 17 during the extrusion process. The jacket material 17 preferably bonds to the reinforcing members 18. Also, the optical fiber ribbon 11 is fed into the central fiber passage 13 which is also formed in the jacket material 17 during the extrusion process. The central fiber passage 13 is between the passages 15 which receive the reinforcing members 18.

During the extrusion process, the optical fiber ribbon 11 is paid-off of a spool 76a and a precursor reinforcing member 18' is paid-off of a spool 76b. The spools 76a and 76b rotate about central axes of rotation 78a and 78b to allow the precursor reinforcing member 18' and the optical fiber ribbon 11 to be paid-off from the spools 76a, 76b as the outer jacket 16 is extruded through the extrusion head 74. A slitter 80 is positioned between the spool 76b and the extrusion head 74. The slitter 80 divides/splits the precursor reinforcing member 18' into the separate reinforcing members 18 which are ultimately fed through the extrusion head 74 on opposite sides of the central fiber passage 13. Because the reinforcing members 18 are both fed off the same spool 76b, uniform (i.e., equal) tension is applied to both of the reinforcing members 18 during the extrusion process. By uniformly tensioning the reinforcing members 18 during the extrusion process, the likelihood of generating internal stresses within the fiber optic cable 10 is reduced thereby enhancing the stress balance of the fiber optic cable 10.

The system 70 may be practiced on a machine 100 (see FIG. 3). The machine 100 includes the spools 76a, 76b and means to rotatably support the axes 78a, 78b of the spools 76a, 76b. The machine 100 also includes the slitter 80 for dividing the precursor reinforcing member 18'. The machine 100 further includes the jacket material source 73 and the extrusion head 74.

Figure 4:
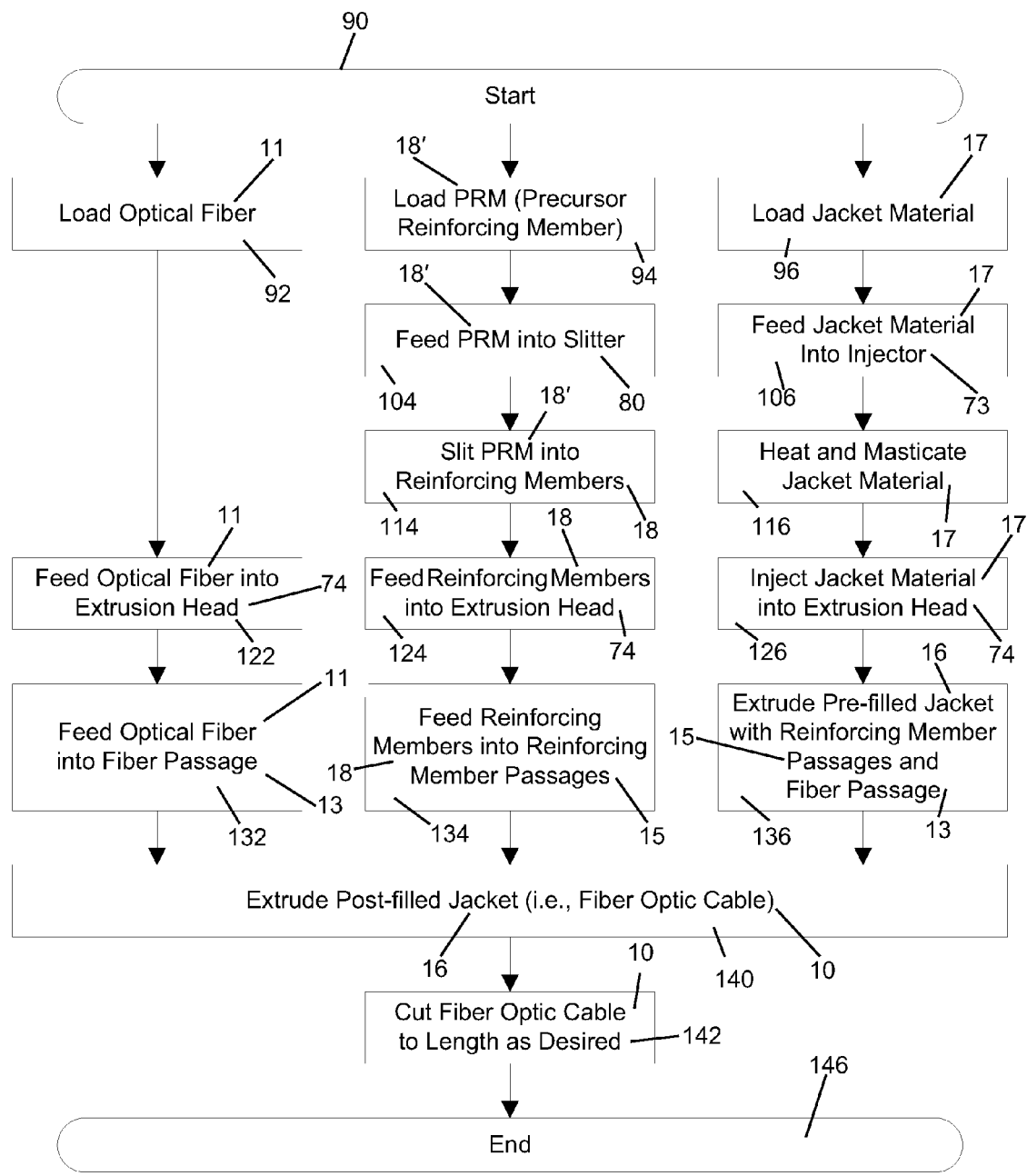
FIG. 4 is a flow chart outlining a method for making the fiber optic cable of FIGS. 1 and 2.

FIG. 4 shows a method for manufacturing the fiber optic cable 10 utilizing the system 70 of FIG. 3. At step 90 of the method, the method is started.

A step 92 of loading the optical fiber ribbon 11 may follow the step 90. The step 92 may include loading the spool 76a, with the optical fiber ribbon 11 included thereon, onto the machine 100.

A step 94 of loading the precursor reinforcing member 18' may follow the step 90. The step 94 may include loading the spool 76b, with the precursor reinforcing member 18' included thereon, onto the machine 100.

A step 96 of loading the jacket material 17 may follow the step 90. The step 96 may include loading the jacket material 17, in granular form, into a hopper 75 of the jacket material source 73 (e.g., an injector) and thereby into the machine 100.

A step 104 of feeding the precursor reinforcing member 18' into the slitter 80 may follow the step 94. The step 104 may include moving an end portion of the precursor reinforcing member 18' from the spool 76b to the slitter 80 and engaging the end portion with the slitter 80.

A step 114 of slitting the precursor reinforcing member 18' into the reinforcing members 18 may follow the step 104. The step 114 may include slitting the precursor reinforcing member 18' into the reinforcing members 18 with the slitter 80.

A step 106 of feeding the jacket material 17 into the jacket material source 73 may follow the step 96. The step 106 may include gravity feeding the jacket material 17 from the hopper 75 into the injector.

A step 116 of heating and masticating the jacket material 17 may follow the step 106. The step 116 may include using heaters and an injection screw of the jacket material source 73.

A step 122 of feeding the optical fiber ribbon 11 into the extrusion head 74 may follow the step 92. The step 122 may include moving an end portion of the optical fiber ribbon 11 from the spool 76a to the extrusion head 74.

A step 124 of feeding the reinforcing members 18 into the extrusion head 74 may follow the step 114. The step 124 may include moving end portions of the reinforcing members 18 from the slitter 80 to the extrusion head 74.

A step 126 of injecting the jacket material 17 into the extrusion head 74 may follow the step 116. The step 126 may include using the injection screw and a nozzle of the jacket material source 73.

A step 132 of feeding the optical fiber ribbon 11 into the fiber passage 13 of the outer jacket 16 may follow the step 122. The step 132 may include using a hollow mandrel of the extrusion head 74.

A step 134 of feeding the reinforcing members 18 into the reinforcing member passages 15 may follow the step 124. The step 134 may include using a hollow mandrel of the extrusion head 74.

A step 136 of extruding the jacket material 17 into the pre-filled outer jacket 16 (i.e., the fiber passage 13 and the reinforcing member passages 15 are not yet filled with the optical fiber ribbon 11 or the reinforcing members 18) may follow the step 126. The pre-filled outer jacket 16 may not necessarily be fully formed yet and the fiber passage 13 and the reinforcing member passages 15 may not necessarily be fully formed yet. The step 136 may include using the hollow mandrels and a die of the extrusion head 74.

A step 140 of extruding the post-filled outer jacket 16 (i.e., the fiber passage 13 and the reinforcing member passages 15 contain the optical fiber ribbon 11 and the reinforcing members 18, respectively) may follow the steps 132, 134, and 136. The step 140 may include a pultrusion process and/or a pressure-driven process of extruding. The step 140 results in an embodiment of the fiber optic cable 10 being produced. In other embodiments, the fiber optic cable 10 may include water-blocking gel 26, water-swellable members, etc.

A step 142 of cutting the fiber optic cable 10 to a desired length may follow the step 140. At a step 146, that may follow the step 142, the method is ended.

The above specification provides examples of how certain inventive aspects may be put into practice. It will be appreciated that the inventive aspects can be practiced in other ways than those specifically shown and described herein without departing from the spirit and scope of the inventive aspects of the present disclosure.

The invention claimed is:

1. A method for manufacturing a fiber optic cable, the method comprising:
   extruding an outer jacket having an elongated transverse cross-sectional profile defining a major axis and a minor axis that meet at a lengthwise axis of the fiber optic cable, the elongated transverse cross-sectional profile having a width that extends along the major axis and a thickness that extends along the minor axis, the width of the elongated transverse cross-sectional profile being longer than the thickness of the elongated transverse cross-sectional profile, the outer jacket also defining a fiber passage that extends through the outer jacket along a lengthwise axis of the outer jacket, the outer jacket further defining first and second reinforcing member passages positioned on opposite sides of the fiber passage;
   feeding an optical fiber ribbon into the fiber passage;
   feeding reinforcing members into the first and second reinforcing member passages, a first set of the reinforcing members aligned with the first reinforcing member passage and a second set of the reinforcing members aligned with the second reinforcing member passage; and
   paying-off the first set and the second set of the reinforcing members from a single spool section as a physically combined set of the reinforcing members and thereby applying uniform tension to the first set and the second set of the reinforcing members.

2. The method of claim 1, wherein the physically combined set of the reinforcing members is paid-off from the single spool section by paying-off a precursor reinforcing member from the single spool section, and then by dividing the precursor reinforcing member into the first and the second sets of the reinforcing members which are fed into the first and second reinforcing member passages, respectively.

3. The method of claim 2, wherein the precursor reinforcing member is divided into the reinforcing members using a slitter.

4. The method of claim 3, further including providing a water-blocking material within the fiber passage of the outer jacket.

5. The method of claim 4, wherein the water-blocking material is a water-blocking gel.

6. The method of claim 2, further including providing a water-blocking material within the fiber passage of the outer jacket.

7. The method of claim 6, wherein the water-blocking material is a water-blocking gel.

8. The method of claim 1, further including providing a water-blocking material within the fiber passage of the outer jacket.

9. The method of claim 8, wherein the water-blocking material is a water-blocking gel.

10. The method of claim 1, wherein the physically combined set of the reinforcing members is aligned with the lengthwise axis of the fiber optic cable.

11. The method of claim 1, wherein the uniform tension is applied to the first and the second sets of the reinforcing members by the single spool section.

12. The method of claim 1, wherein the first and the second sets of the reinforcing members are symmetrically arranged about the physically combined set of the reinforcing members.

13. A method for manufacturing a fiber optic cable, the method comprising:
    extruding an outer jacket having an elongated transverse cross-sectional profile defining a major axis and a minor axis that meet at a lengthwise axis of the fiber optic cable, the elongated transverse cross-sectional profile having a width that extends along the major axis and a thickness that extends along the minor axis, the width of the elongated transverse cross-sectional profile being longer than the thickness of the elongated transverse cross-sectional profile, the outer jacket also defining a fiber passage that extends through the outer jacket along a lengthwise axis of the outer jacket, the outer jacket further defining first and second reinforcing member passages positioned on opposite sides of the fiber passage;

feeding an optical fiber ribbon into the fiber passage; and feeding reinforcing members into the first and second reinforcing member passages, the reinforcing members being paid-off from a single spool as a single precursor reinforcing member, the single precursor reinforcing member aligned with the lengthwise axis of the fiber optic cable;

wherein the single precursor reinforcing member from the single spool is divided into first and second sets of the reinforcing members which are respectively fed into the first and second reinforcing member passages at uniform tension.

14. The method of claim 13, wherein the single precursor reinforcing member is divided into the reinforcing members using a slitter.

15. The method of claim 13, further including providing a water-blocking material within the fiber passage of the outer jacket.

16. The method of claim 15, wherein the water-blocking material is a water-blocking gel.

17. The method of claim 13, wherein the first and the second sets of the reinforcing members are symmetrically arranged about the single precursor reinforcing member and the lengthwise axis of the fiber optic cable.

18. A method for manufacturing a fiber optic cable, the method comprising:

routing reinforcing members from a single spool to an extrusion head, the reinforcing members paid-off from the single spool as a physically combined set of reinforcing members;

dividing the physically combined set of reinforcing members into first and second sets of reinforcing members with a dividing device positioned between the single spool and the extrusion head, the first and second sets of reinforcing members being uniformly tensioned;

forming an outer jacket having an elongated transverse cross-sectional profile with the extrusion head;

feeding an optical fiber into a fiber passage that extends through the outer jacket along a lengthwise axis of the outer jacket; and feeding the uniformly tensioned first and second sets of reinforcing members into first and second reinforcing member passages of the outer jacket, the first and second reinforcing member passages positioned on opposite sides of the fiber passage.

19. The method of claim 18, wherein the reinforcing members are routed directly from the single spool to the extrusion head.

20. The method of claim 18, wherein a fiber spool feeds the optical fiber into the fiber passage, wherein the fiber spool is positioned between the dividing device and the extrusion head, and wherein the first and second sets of reinforcing members are symmetrically positioned about the optical fiber.

* * * * *